(12) United States Patent
Sung et al.

(10) Patent No.: US 12,282,923 B2
(45) Date of Patent: *Apr. 22, 2025

(54) REAL AND VIRTUAL IDENTITY VERIFICATION CIRCUIT, SYSTEM THEREOF AND ELECTRONIC TRANSACTION METHOD

(71) Applicant: SAMTON INTERNATIONAL DEVELOPMENT TECHNOLOGY CO., LTD., Apia (WS)

(72) Inventors: Chia-Yu Sung, New Taipei (TW); Yu-Chuan Jian, Nantou County (TW); Yu-Chang Jian, Nantou County (TW); Yi-Fen Tsui, New Taipei (TW)

(73) Assignee: SAMTON INTERNATIONAL DEVELOPMENT TECHNOLOGY CO., LTD., Apia (WS)

( * ) Notice: Subject to any disclaimer, the term of this patent is extended or adjusted under 35 U.S.C. 154(b) by 196 days.

This patent is subject to a terminal disclaimer.

(21) Appl. No.: 17/470,554

(22) Filed: Sep. 9, 2021

(65) Prior Publication Data

US 2022/0005048 A1    Jan. 6, 2022

Related U.S. Application Data

(63) Continuation of application No. 13/852,499, filed on Mar. 28, 2013, now Pat. No. 11,151,565.

(30) Foreign Application Priority Data

Apr. 25, 2012   (TW) .................................. 101114614

(51) Int. Cl.
*G06Q 20/40*    (2012.01)
*G06F 21/32*    (2013.01)

(52) U.S. Cl.
CPC ....... *G06Q 20/40145* (2013.01); *G06F 21/32* (2013.01); *G06F 2221/2115* (2013.01); *G06Q 2220/00* (2013.01)

(58) Field of Classification Search
None
See application file for complete search history.

(56) References Cited

U.S. PATENT DOCUMENTS 7,155,416 B2    12/2006  Shatford
7,367,049 B1 *   4/2008  Robinson ................. G06F 21/32
                                                713/186

(Continued)

FOREIGN PATENT DOCUMENTS

AU    2004254771 A1 *  1/2005  ............. G06F 21/32
AU    2011342282 A1 *  8/2013  ........... G06Q 20/027

(Continued)

OTHER PUBLICATIONS

Asha et al., Biometrics: An Overview of the Technology, Issues and Applications. https://citeseerx.ist.psu.edu/document?repid=rep1&type=pdf&doi=4e67c38a8e2386d3edf12e2e049870143540a583 (Year: 2012).*

(Continued)

*Primary Examiner* — El Mehdi Oussir
(74) *Attorney, Agent, or Firm* — Muncy, Geissler, Olds & Lowe, P.C.

(57) ABSTRACT

Disclosed are a real and virtual identity verification circuit, a system thereof and an electronic transaction method. The circuit is capable of being built in or connected with an electronic device to allow a user to carry out electronic identity verification with his or her unique biological characteristic on a remote server. The real and virtual identity verification circuit comprises a memory unit, an acquisition unit, a processing unit and a communication unit. A verification key code is stored by the memory unit. The acquisi- (Continued)

tion unit acquires the biological characteristic and generates a corresponding biological characteristic code. The processing unit processes the verification key code and the biological characteristic code according to a deal process to generate a corresponding unverified code, and the communication unit transmits the unverified code to the server and awaits a verification result of the electronic identity verification.

7 Claims, 4 Drawing Sheets

(56) References Cited

U.S. PATENT DOCUMENTS

| | | | |
|---|---|---|---|
| 7,489,050 B2 * | 2/2009 | Matsuura | B60R 25/209 307/10.5 |
| 7,506,818 B2 * | 3/2009 | Beenau | G06Q 20/382 235/382 |
| 7,564,997 B2 | 7/2009 | Hamid | |
| 7,690,577 B2 * | 4/2010 | Beenau | G06Q 20/327 340/5.4 |
| 7,809,169 B2 | 10/2010 | Martinez | |
| 8,150,039 B2 * | 4/2012 | de Cesare | G06F 21/575 380/278 |
| 8,234,220 B2 * | 7/2012 | Weiss | G06Q 20/382 705/64 |
| 8,335,926 B2 * | 12/2012 | Clemmensen | G06F 21/34 380/37 |
| 8,397,988 B1 * | 3/2013 | Zuili | G06Q 20/409 235/383 |
| 9,078,128 B2 * | 7/2015 | Medina | H04L 63/0807 |
| 9,544,145 B2 * | 1/2017 | Ishizaka | H04L 41/28 |
| 2003/0074317 A1 * | 4/2003 | Hofi | G06Q 40/00 705/64 |
| 2004/0133787 A1 | 7/2004 | Doughty et al. | |
| 2004/0230536 A1 * | 11/2004 | Fung | G06Q 20/382 705/64 |
| 2005/0033973 A1 * | 2/2005 | Kamada | G06F 12/145 713/193 |
| 2005/0154924 A1 | 7/2005 | Scheidt et al. | |
| 2005/0235148 A1 | 10/2005 | Scheidt et al. | |
| 2006/0016871 A1 | 1/2006 | Bonalle et al. | |
| 2006/0095369 A1 * | 5/2006 | Hofi | G06Q 20/40145 705/76 |
| 2006/0200427 A1 | 9/2006 | Morrison et al. | |
| 2006/0224456 A1 | 10/2006 | Walker et al. | |
| 2006/0237529 A1 | 10/2006 | Kelley et al. | |
| 2007/0067833 A1 | 3/2007 | Colnot | |
| 2007/0118891 A1 | 5/2007 | Buer | |
| 2007/0174206 A1 * | 7/2007 | Colella | G06Q 20/40 705/64 |
| 2007/0220273 A1 | 9/2007 | Campisi | |
| 2007/0245158 A1 | 10/2007 | Giobbi et al. | |
| 2007/0250920 A1 | 10/2007 | Lindsay | |
| 2007/0292006 A1 * | 12/2007 | Johnson | G06Q 20/40 705/44 |
| 2008/0217400 A1 * | 9/2008 | Portano | G06Q 20/04 235/380 |
| 2009/0172402 A1 | 7/2009 | Tran | |
| 2009/0203355 A1 | 8/2009 | Clark | |
| 2009/0228300 A1 | 9/2009 | Hamel et al. | |
| 2009/0287837 A1 * | 11/2009 | Felsher | G06F 21/6245 709/229 |
| 2009/0292641 A1 | 11/2009 | Weiss | |
| 2009/0309696 A1 * | 12/2009 | Tsuruta | B60R 25/04 340/5.22 |
| 2010/0027046 A1 * | 2/2010 | Maeda | G06K 15/02 358/1.14 |
| 2010/0030696 A1 | 2/2010 | Naccache | |
| 2010/0150353 A1 * | 6/2010 | Bauchot | H04L 9/3271 713/168 |
| 2010/0250957 A1 * | 9/2010 | Cuppett | G06F 21/41 713/186 |
| 2010/0317420 A1 * | 12/2010 | Hoffberg | G06Q 30/0282 463/1 |
| 2011/0125613 A1 | 5/2011 | Franchi | |
| 2011/0184867 A1 | 7/2011 | Varadarajan | |
| 2011/0191250 A1 | 8/2011 | Bishop et al. | |
| 2011/0264919 A1 | 10/2011 | Pizano et al. | |
| 2012/0028609 A1 * | 2/2012 | Hruska | H04W 12/02 455/411 |
| 2013/0066786 A1 | 3/2013 | Joyce | |
| 2013/0081145 A1 | 3/2013 | Pitt et al. | |
| 2014/0229388 A1 | 8/2014 | Pereira et al. | |
| 2015/0106621 A1 | 4/2015 | Burke | |
| 2015/0206147 A1 | 7/2015 | Stanfield et al. | |
| 2017/0200139 A1 | 7/2017 | Dabrowski | |
| 2017/0213010 A1 * | 7/2017 | Sucilla | G16H 20/10 |
| 2018/0075451 A1 * | 3/2018 | Yang | G06Q 20/3829 |
| 2018/0121924 A9 | 5/2018 | Johnson | |
| 2018/0158278 A1 | 6/2018 | Dabrowski et al. | |
| 2019/0372759 A1 * | 12/2019 | Rix | H04L 9/0838 |

FOREIGN PATENT DOCUMENTS

| | | | | |
|---|---|---|---|---|
| CA | 2361405 A1 | * | 1/2000 | |
| CA | 2399610 A1 | * | 2/2001 | |
| CA | 2760938 A1 | * | 11/2010 | G06F 21/31 |
| CA | 2773543 A1 | * | 3/2011 | G06F 21/34 |
| CA | 2774178 A1 | * | 3/2011 | G06F 21/35 |
| CA | 2384416 C | * | 11/2011 | C07K 14/53 |
| CN | 1266520 A | * | 9/2000 | G06Q 20/00 |
| CN | 1777854 A | * | 5/2006 | G06F 21/32 |
| CN | 1801710 A | * | 7/2006 | G06F 21/31 |
| CN | 101101687 A | * | 1/2008 | G06F 21/32 |
| CN | 101375284 A | * | 2/2009 | G06F 16/22 |
| CN | 101675421 A | * | 3/2010 | G06F 21/34 |
| CN | 101944998 A | * | 1/2011 | G06F 21/32 |
| CN | 102301642 A | * | 12/2011 | G06Q 20/10 |
| CN | 103119598 A | * | 5/2013 | G06F 21/31 |
| CN | 103270524 A | * | 8/2013 | G06F 21/34 |
| CN | 103282923 A | * | 9/2013 | G06F 21/31 |
| CN | 103443719 A | * | 12/2013 | G05B 1/01 |
| CN | 105224417 A | * | 1/2016 | G06F 11/1402 |
| EP | 1773018 A1 | * | 4/2007 | G06F 21/305 |
| EP | 2012249 A1 | * | 1/2009 | G06F 21/32 |
| EP | 2180633 A1 | * | 4/2010 | G06F 21/32 |
| EP | 2639726 A1 | * | 9/2013 | G06F 21/31 |
| EP | 1925113 B1 | * | 11/2018 | G06F 21/32 |
| GB | 2499193 A | * | 8/2013 | G06F 21/32 |
| GB | 2499194 A | * | 8/2013 | G06F 21/32 |
| JP | 2005346120 A | * | 12/2005 | G06F 21/32 |
| JP | 2006155628 A | * | 6/2006 | G06F 21/32 |
| JP | 2007148470 A | * | 6/2007 | G06F 21/305 |
| JP | 5362558 B2 | * | 12/2013 | G06F 21/32 |
| KR | 20040051798 A | * | 12/2002 | |
| KR | 20080075956 A | * | 8/2008 | |
| KR | 20110029032 A | * | 3/2011 | |
| KR | 20130029986 A | * | 9/2011 | |
| KR | 101297118 B1 | | 8/2013 | |
| KR | 20160086830 A | * | 11/2014 | |
| TW | 1357752 A | | 1/2010 | |
| WO | WO-0159732 A2 | * | 8/2001 | G06Q 20/04 |
| WO | WO-0232308 A1 | * | 4/2002 | G06F 21/32 |
| WO | WO-2006029297 A2 | * | 3/2006 | G06Q 20/0652 |
| WO | WO-2007122726 A1 | * | 11/2007 | G06F 21/32 |
| WO | WO-2007131172 A2 | * | 11/2007 | G06Q 30/0212 |
| WO | WO-2009094433 A1 | * | 7/2009 | G06Q 20/02 |

OTHER PUBLICATIONS

N. A. Albahbooh and P. Bours, "A Mobile Phone Device as a Biometrics Authentication Method for an ATM Terminal," 2015 IEEE International Conference on Computer and Information Technology. Liverpool, UK, 2015, pp. 2017-2024. https://ieeexplore.ieee.org/document/7363345?source=IQplus (Year: 2015).*

J.-Z. Lu, T. Chen, J. Zhou, J. Yang and J. Jiang, "An enhanced biometrics-based remote user authentication scheme using smart

(56) References Cited

OTHER PUBLICATIONS cards," 2013 6th International Congress on Image and Signal Processing (CISP), Hangzhou, China. https://ieeexplore.ieee.org/document/6743940?source=IQplus (Year: 2013).*
J. Yang, "Biometrics Verification Techniques Combing with Digital Signature for Multimodal Biometrics Payment System," 2010 International Conference on Management of e-Commerce and e-Government, Chengdu, China, 2010, pp. 405-410. https://ieeexplore.ieee.org/document/5628736?source=IQplus (Year: 2010).*
C.-M. Hsu and H.-M. Chao, "Securing Computerized Personal Data during Transit and at Rest Using Programmable System on Chip (PSoC) Technology," 2009 WRI World Congress on Computer Science and Information Engineering, 2009. https://ieeexplore.ieee.org/document/5171030?source=IQplus (Year: 2009).*
D. D. Hwang and I. Verbauwhede, "Design of portable biometric authenticators—energy, performance, and security tradeoffs," in IEEE Transactions on Consumer Electronics, vol. 50, No. 4, pp. 1222-1231, Nov. 2004 https://ieeexplore.ieee.org/document/1362523?source=IQplus (Year: 2004).*
Feng Hao, R. A. (Sep. 2006). Combining Crypto with Biometrics Effectively. 55, 9. IEEE Transaction on Computers. Retrieved from https://ieeexplore.ieee.org/stamp/stamp.jsp?tp=&arnumber=1668036 (Year: 2006).
Murillo-Escobar, M., et al. (2015). A robust embedded biometric authentication system based on fingerprint and chaotic encryption. (42 8198-8211). Expert Systems with Applications. Retrieved from https://reader.elsevier.com/reader (Year: 2015).
Office Action issued by TIPO, Taiwan for case 10421266440 on Sep. 18, 2015 (22 pages).
Search report issued by TIPO, Taiwan for case 101114614 dated Apr. 25, 2012 (2 pages).

* cited by examiner

REAL AND VIRTUAL IDENTITY VERIFICATION CIRCUIT, SYSTEM THEREOF AND ELECTRONIC TRANSACTION METHOD

CROSS-REFERENCE TO RELATED APPLICATIONS

This application is a Continuation of co-pending application Ser. No. 13/852,499, filed on Mar. 28, 2013, for which priority is claimed under 35 U.S.C. § 120; this application claims priority of Taiwan Patent Application No. 101114614, filed on Apr. 25, 2012 under 35 U.S.C. § 119, the entirety contents of all of which are incorporated by reference herein.

FIELD OF THE INVENTION

This invention relates to a real and virtual identity verification circuit, a system comprising the same and an electronic transaction method, capable of carrying out electronic identity verification with high security in a virtual environment on the Internet through the use of a user's unique biological characteristic in a real environment.

BACKGROUND OF THE INVENTION

Recently, with the growing popularity of the virtual environment established by the Internet and its penetration into the real environment of consumers, new lifestyles appear rapidly and change people's consumption habits. For example, instead of doing shopping in a real store, more and more consumers choose to make online transaction in the virtual environment, such as a shopping platform built on the Internet.

There are several reasons why virtual stores gradually replace real ones and grasp a substantial share of the market. In contrast to real stores, the virtual environment provides a low-cost sales channel to reduce considerable real store costs and personnel costs. In addition, the virtual environment provides consumers with much more flexibility, allowing them to do shopping anytime and anywhere.

However, the most important issue for consumption in the virtual environment is how to determine of consumer's identity in the real environment. Apparently, consumer's identity can be confirmed by a real identity certificate or proof of identity; however, in the virtual environment, documents are prone to alteration since they are available only in the electronic form. Accordingly, it is desirable to verify the identity of a consumer in a highly secure way in the virtual environment.

To address the above-identified problem, many solutions have been proposed. For example, consumers may first create an account representing their identity and a set of password for the account, such that they can perform operations in the virtual environment with the account and the password, such as performing electronic transaction with a credit card and the account as well as the password. Nevertheless, security may be jeopardized if the account and the password or even the credit card is hacked. Another approach is to electronically verify an identity document, which is mostly used by the government agencies. For example, a certification IC card is issued upon application by a household registration office according to the applicant's unique identity, and the certification IC card may be used to represent the holder's identity. Although the electronic identity system established by the government is authoritative and reliable, the verification process may still be damaged because it uses fixed passwords. In addition, in order to maintain its security, the system adopts a closed design mostly limited to government purposes and is rarely opened to the private sector.

Furthermore, some commodities, such as lottery tickets, are not currently suitable for consumption by electronic transaction. Lottery tickets are un-inscribed value-bearing instruments, so the one who holds a lottery ticket is deemed to be its owner. Thus, the purchase of lottery tickets usually has to be done by consumers in person, making lottery transaction quite inconvenient.

Accordingly, the present invention provides a real and virtual identity verification circuit, a system comprising the same and an electronic transaction method to address the drawbacks mentioned above.

SUMMARY OF THE INVENTION

It is an object of this invention to provide a real and virtual identity verification circuit capable of being built in or connected with an electronic device to carry out highly secure electronic identity verification of a user with his or her unique biological characteristic on a remote server.

It is another object of this invention to use the above-mentioned real and virtual identity verification circuit, through the generation of a biological characteristic code associated with the unique biological characteristic of a user by several deal processes, to achieve various types of electronic identity verification.

It is another object of this invention to provide a real and virtual identity verification system for electronic identity verification, which is formed by the real and virtual identity verification circuit and the server.

It is still another object of this invention to provide an electronic transaction method realizing highly secure electronic transaction in the real environment through the virtual environment based on the verification result of electronic identity verification performed by the real and virtual identity verification system.

These and other objects are accomplished by a real and virtual identity verification circuit capable of being built in or connected with an electronic device to allow a user to carry out electronic identity verification with his or her unique biological characteristic on an Internet-based server storing data associated with the biological characteristic. The real and virtual identity verification circuit comprises a memory unit, an acquisition unit, a processing unit and a communication unit. The memory unit has a storage space for storing a verification key code. The acquisition unit acquires the biological characteristic and generates a corresponding biological characteristic code. The processing unit, which is connected with the memory unit and the acquisition unit and provided with a deal process, processes the verification key code and the biological characteristic code according to the deal process to generate a corresponding unverified code. The communication unit, which is connected with the processing unit, transmits the unverified code to the Internet and awaits a verification result of the electronic identity verification associated with the unverified code from the server.

These and other objects are also accomplished by a real and virtual identity verification system enabling a user to carry out electronic identity verification with his or her unique biological characteristic. The system comprises an electronic device and a server. The electronic device comprises a memory unit, an acquisition unit, a processing unit and a communication unit, wherein the memory unit has a storage space for storing a verification key code; the acquisition unit acquires the biological characteristic and generates a biological characteristic code corresponding to the biological characteristic; the processing unit is connected with the memory unit and the acquisition unit and provided with a deal process, the processing unit processing the verification key code and the biological characteristic code according to the deal process to generate a corresponding unverified code; and the communication unit is connected with the processing unit and transmits the unverified code to the Internet. The server comprises a database unit, a transceiving unit, a verification unit, and a feedback unit, wherein the database unit stores the biological characteristic of the user; the transceiving unit receives the unverified code; the verification unit is connected with the database unit and the transceiving unit and adapted for verifying the biological characteristic and the unverified code to generate a verification result; and the feedback unit is connected with the verification unit and adapted for sending the verification result to the electronic device via the transceiving unit to complete the verification of the user's identity.

These and other objects are further accomplished by an electronic transaction method enabling a user to make an electronic transaction on at least one transaction sub-server connected with a transaction server containing an indicated link path of the transaction sub-server after the user obtains a verification result of electronic identity verification performed by a real and virtual identity verification system including an electronic device and a server with the use of a biological characteristic, the method comprising (a) connecting the electronic device to the transaction server to select the indicated link path of the transaction sub-server at the transaction server; and (b) using the electronic device to receive the verification result such that the transaction server selectively allows the user to make the electronic transaction, wherein the user is selectively enabled to carry out the electronic transaction on the transaction sub-server directly via the transaction server according to the verification result and the indicated link path.

In one embodiment, the electronic transaction is related to electronic lottery, the transaction server is a financial platform, and the transaction sub-server is a lottery vending machine.

In contrast to prior arts, the real and virtual identity verification circuit, the system thereof and the electronic transaction method enable a user to convert his or her biological characteristic into a corresponding biological characteristic code with the use of one of a plurality of deal processes, and the biological characteristic code may be used by a remote server for performing electronic identity verification of the user. In one aspect, the server is capable of confirming the consistency between the biological characteristic code and the biological characteristic stored in the server, and the verification result is then transmitted back to the real and virtual identity verification circuit to complete the electronic identity verification of the user. Accordingly, the user can make highly secure electronic transaction according to the verification result, such as buying an electronic lottery ticket in a lottery transaction mode.

BRIEF DESCRIPTION OF THE DRAWINGS

A more complete understanding of the subject matter can be derived by referring to the detailed description and claims when considered in conjunction with the following figures, wherein like reference numbers refer to similar elements throughout the figures.

DETAILED DESCRIPTION OF THE INVENTION

Embodiments are illustrated in the accompanying figures to improve understanding of concepts, features and advantages presented by the present invention.

Figure 1:
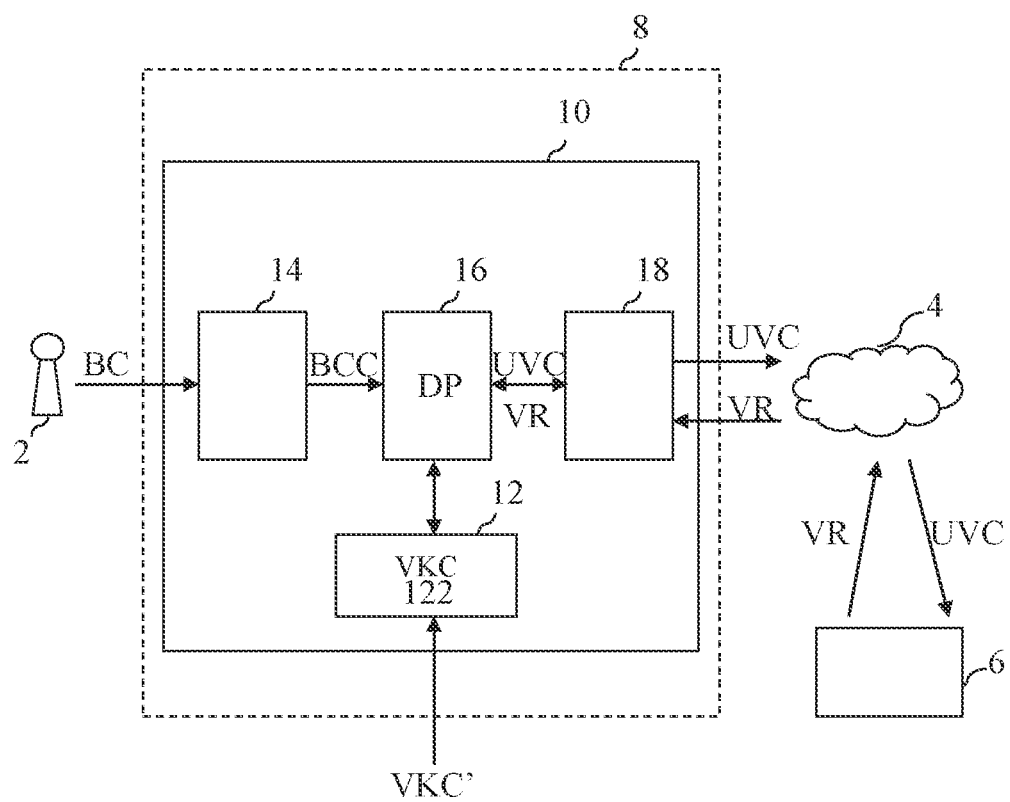
FIG. 1 illustrates a block diagram of the real and virtual identity verification circuit of one embodiment of this invention.

FIG. 1 illustrates a block diagram of the real and virtual identity verification circuit of one embodiment of this invention. The real and virtual identity verification circuit 10 enables a user 2 to perform electronic identity verification with his or her unique biological characteristic BC on a server 6 pre-storing data associated with the biological characteristic BC on the Internet 4. In one embodiment, the biological characteristic BC may be for example a fingerprint, an iris pattern, a palm print, a vein pattern, a sound pattern or a facial pattern of the user 2.

The real and virtual identity verification circuit 10 may be built in or connected with an electronic device 8. In other words, the real and virtual identity verification circuit 10 may be either embedded in an electronic device 8 or connected with an external electronic device 8. The electronic device 8 may be a portable mobile communication device, a tablet computer or a stationary personal computer. If the real and virtual identity verification circuit 10 is used externally from the electronic device 8, it may be integrated in another electronic product such as a flash drive.

In one embodiment, the real and virtual identity verification circuit 10 comprises a memory unit 12, an acquisition unit 14, a processing unit 16 and a communication unit 18.

The memory unit 12 has a storage space for storing a verification key code VKC, which is generated by any one of the following procedures:

1) the verification key code VKC corresponding to the biological characteristic BC is pre-saved in the memory unit 12;
2) the memory unit 12 is provided with the verification key code VKC which is associated with the electronic device 8, such as one of a media access control (MAC) address, a subscriber identity module (SIM) and a password of the electronic device 8 which may be flexibly set by the user;
3) the memory unit 12 receives via the communication unit 18 a variable key code VKC' generated by a third party server or the server 6 and forms the verification key code VKC, such that the variable key code VKC' allows periodic change of the verification key code VKC. For example, the variable key code VKC' is passively changed within a duration such as microsecond(s), millisecond(s), second(s), hour(s), day(s), month(s) or year(s). Alternatively, in an active replacement mode, the real and virtual identity verification circuit 10 may retrieve the variable key code VKC' from the third party server or the server 6 only when the user 2 proceeds electronic identity verification; and 4) the verification key code VKC is formed from the biological characteristic BC obtained by the acquisition unit 14 and is saved in the memory unit 12. As such, the user 2 is allowed to flexibly establish the verification key code VKC associated with the biological characteristic BC for the purpose of electronic identity verification.

The acquisition unit 14 is configured to acquire the biological characteristic BC and generate a biological characteristic code BCC corresponding to the biological characteristic BC. In one embodiment, the acquisition unit 14, such as a camera or a fingerprint recognition device, is configured to acquire, among others, a fingerprint, an iris pattern, a palm print, a vein pattern, a sound pattern or a facial pattern.

The processing unit 16 is connected with the memory unit 12 and the acquisition unit 14 and provided with a deal process DP, such that the processing unit 16 processes the verification key code VKC and the biological characteristic code BCC to generate a corresponding unverified code UVC. In one embodiment, the deal process DP is configured for any one of the following purposes:

1) the deal process DP compares the biological characteristic code BCC with the verification key code VKC to determine whether to generate the unverified code UVC;
2) the deal process DP encodes the biological characteristic code BCC and the verification key code VKC to generate the unverified code UVC corresponding to or including the biological characteristic code BCC and the verification key code VKC; and
3) the deal process DP selects the biological characteristic code BCC or the verification key code VKC to generate the unverified code UVC.

The communication unit 18 is connected with the processing unit 16 for transmitting the unverified code UVC to the Internet 4 and awaiting a verification result VR of the electronic identity verification associated with the unverified code UVC from the server 6. In one embodiment, the communication unit 18 transmits the unverified code UVC via wired or wireless communication, and the communication unit 18 is in compliance with a communication protocol of BLUETOOTH, fixed network communication, mobile communication, or WI-FI.

Figure 2:
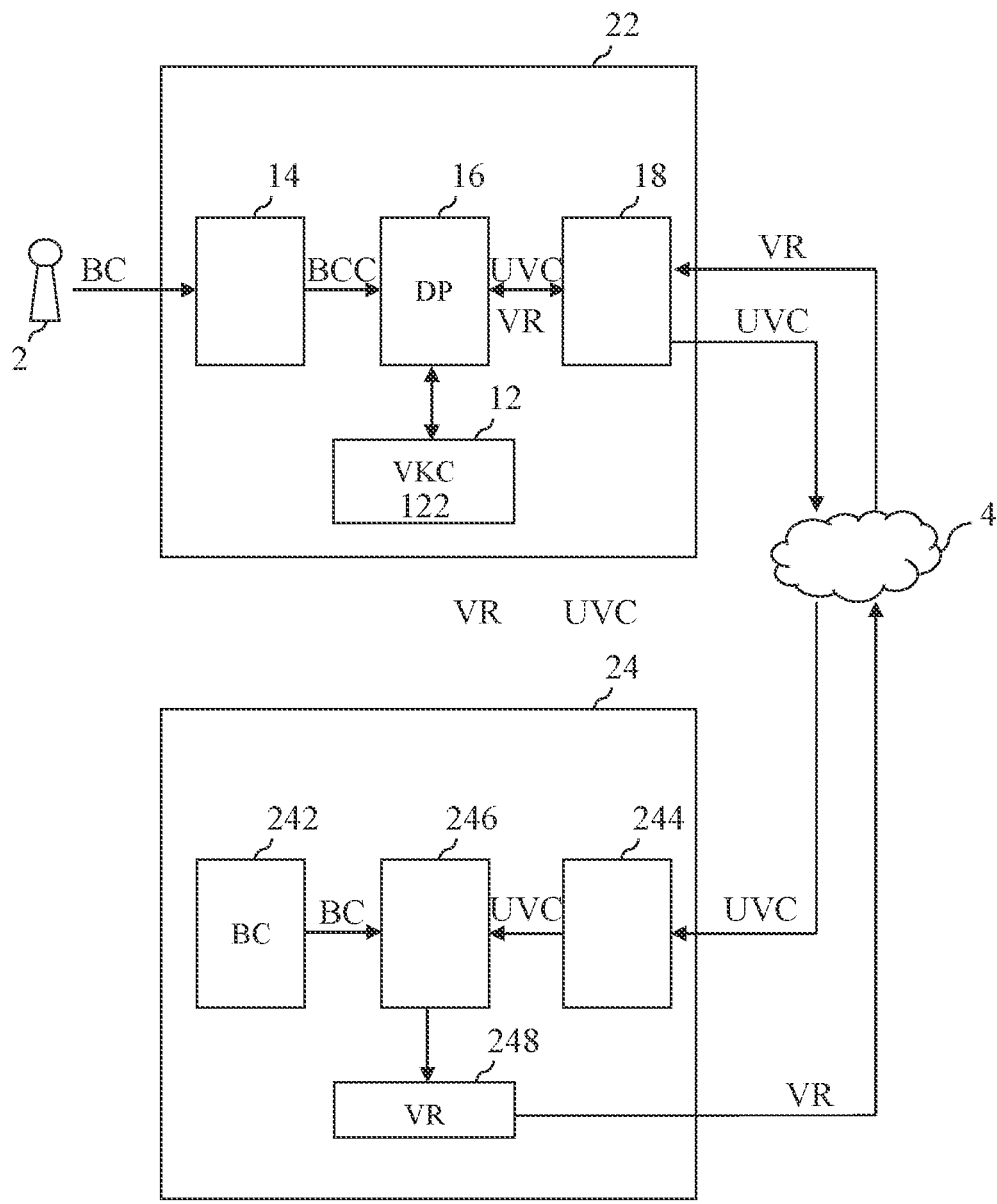
FIG. 2 illustrates a block diagram of the real and virtual identity verification system of one embodiment of this invention.

FIG. 2 illustrates a block diagram of the real and virtual identity verification system of one embodiment of this invention. The real and virtual identity verification system 20 enables the user 2 to carry out electronic identity verification with his or her unique biological characteristic BC. In this embodiment, the real and virtual identity verification system 20 comprises an electronic device 22 and a server 24.

As mentioned in the previous embodiment, the electronic device 22 is built in with the real and virtual identity verification circuit 10 comprising the memory unit 12, the acquisition unit 14, the processing unit 16 and the communication unit 18.

The server 24 comprises a database unit 242, a transceiving unit 244, a verification unit 246 and a feedback unit 248.

The database unit 242 is configured for storing the biological characteristic BC of the user 2, which may be acquired in advance and saved in the database unit 242 to complete the registration of the biological characteristic BC therein. In one embodiment, the database unit 242 is configured for storing the biological characteristic BC as a fingerprint, an iris pattern, a palm print, a vein pattern, a sound pattern or a facial pattern.

The transceiving unit 244 is configured for receiving the unverified code UVC.

The verification unit 246 is connected with the database unit 242 and the transceiving unit 244 and configured for verifying, such as by comparison, the biological characteristic BC and the unverified code UVC and determining whether the unverified code UVC matches the biological characteristic BC pre-saved in the database unit 242 to generate the verification result VR indicating the verification outcome such as matched, not matched or determination failure.

The feedback unit 248 is connected with the verification unit 246 and configured for sending the verification result VR to the electronic device 22 to complete the verification of the user's identity.

Figure 3:
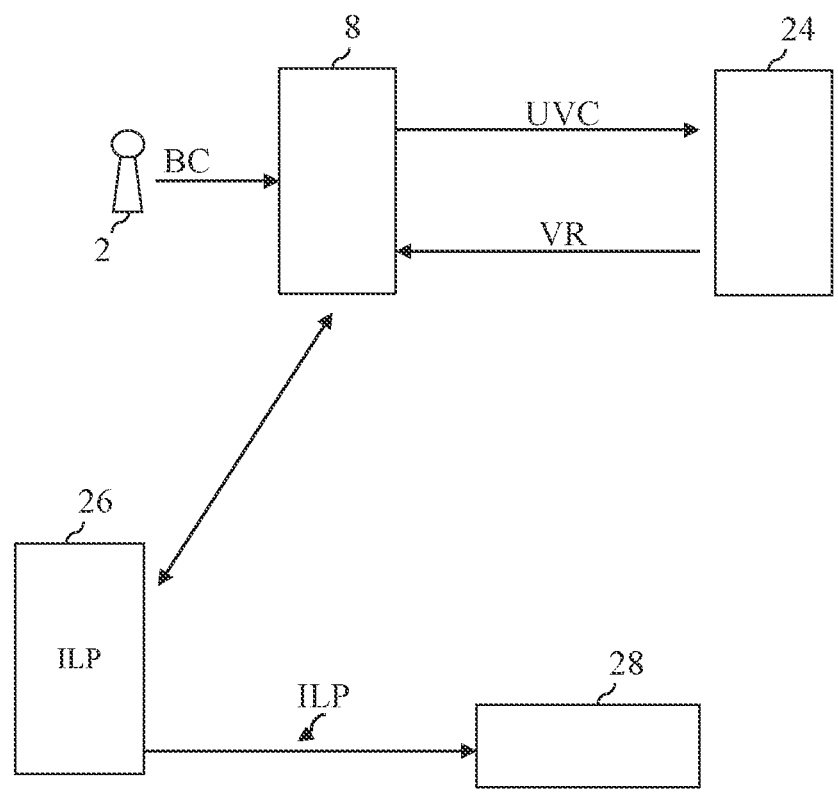
FIG. 3 illustrates a block diagram of the electronic transaction method of one embodiment of this invention.
Figure 4:
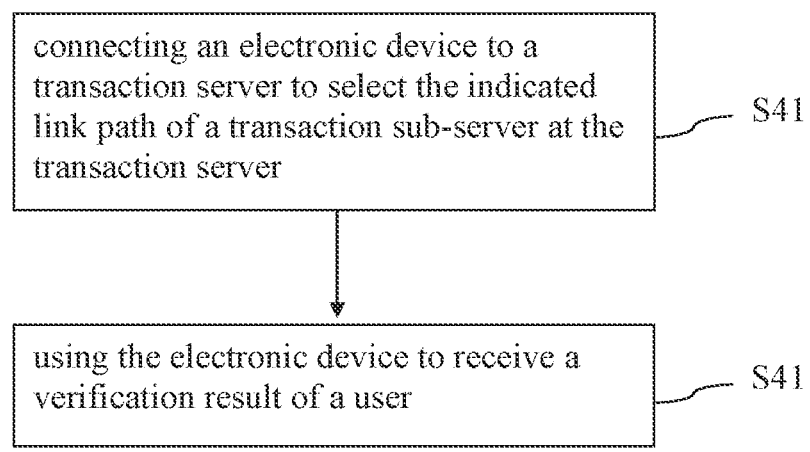
FIG. 4 illustrates a flowchart of the electronic transaction method of FIG. 3.

FIGS. 3 and 4 illustrate respectively a block diagram and a flowchart of the electronic transaction method of one embodiment of this invention. In the architecture illustration of FIG. 3, the electronic transaction method enables the user 2 to make an electronic transaction on at least one transaction sub-server 28 (e.g. a shopping website or a lottery vending machine) connected with a transaction server 26 (e.g. a bank server or a cash flow platform) containing an indicated link path ILP of the transaction sub-server 28 after the user 2 obtains a verification result VR of electronic identity verification performed by a real and virtual identity verification system including the electronic device 8 and the server 24 with the use of a biological characteristic.

In FIG. 4, the electronic transaction method begins with the step S41 for connecting the electronic device 8 to the transaction server 26 to select the indicated link path ILP of the transaction sub-server 28 at the transaction server 26.

Next, the step S42 comprises using the electronic device 8 to receive the verification result VR of the user 2 such that the transaction server 26 selectively allows the user 2 to carry out the electronic transaction, by which the user 2 is selectively enabled to make the electronic transaction on the transaction sub-server 28 directly via the transaction server 26 according to the verification result VR and the indicated link path ILP.

In one embodiment, the transaction server 26 provides the electronic device 8 with the geographical location of a transaction sub-server 28 in proximity to the electronic device 8 according to one of the geographical location of the electronic device 8 and the information related to the user 2.

In another embodiment, the electronic transaction is related to electronic lottery, the transaction server 26 is a financial platform, and the transaction sub-server 28 is a lottery vending machine.

Under the electronic transaction mode of electronic lottery, after the user 2 makes the electronic transaction on the lottery vending machine, the lottery vending machine produces a paper-based lottery ticket bearing lottery information, such as the number(s) chosen by the user 2.

In addition, the lottery information of the paper-based lottery ticket is then transmitted back to the electronic device 8 to solely allow the user 2 with the biological characteristic BC to virtually possess the paper-based lottery ticket.

In another embodiment, the transaction sub-server 28 preserves the paper-based lottery ticket and associates the biological characteristic BC of the user 2 with the paper-based lottery ticket to solely allow the user 2 with the biological characteristic BC to acquire the paper-based lottery ticket.

In addition, the user 2 is allowed to retrieve the paper-based lottery ticket from the lottery vending machine with the biological characteristic BC.

The real and virtual identity verification circuit, the system thereof and the electronic transaction method enable a user to convert his or her biological characteristic into a corresponding biological characteristic code with the use of one of a plurality of deal processes, and the biological characteristic code may be used by a remote server for performing electronic identity verification of the user. In one aspect, the server is capable of confirming the consistency between the biological characteristic code and the biological characteristic stored in the server, and the verification result is then transmitted back to the real and virtual identity verification circuit to complete the electronic identity verification of the user. Accordingly, the user can make highly secure electronic transaction according to the verification result, such as buying an electronic lottery ticket in a lottery transaction mode.

While these descriptions directly describe the above embodiments, it is understood that those skilled in the art may conceive modifications and/or variations to the specific embodiments shown and described herein. However, any such modifications or variations that fall within the scope of this description are intended to be included therein as well.

What is claimed is:

1. An identity verification circuit for an electronic device to allow a user to carry out electronic identity verification with a biological characteristic of the user on an authentication server storing data associated with the biological characteristic, the identity verification circuit comprising:
    a memory having a storage space for storing a verification key code;
    a biological characteristics acquisition device configured to acquire the biological characteristic and generating a biological characteristic code corresponding to the biological characteristic, wherein the biological characteristics acquisition device is configured to acquire a fingerprint, an iris pattern, a palm print, a vein pattern, a sound pattern or a facial pattern;
    a processor connected with the memory and the biological characteristics acquisition device and provided with a program code, the processor comparing the biological characteristic code with the verification key code according to the program code to determine whether to generate the unverified code and, after the unverified code is determined to be generated, processing the biological characteristic code and the verification key code according to the program code to generate the unverified code corresponding to at least one of the biological characteristic code and the verification key code; and
    a communicator connected with the processor and configured to transmit the unverified code to the authentication server through the Internet based on an instruction by the processor and to receive a verification result of the electronic identity verification associated with the unverified code from the authentication server, wherein the communicator is connected with the memory such that the communicator receives a variable key code to be stored in the memory to form the verification key code in the memory, and the variable key code is passively changed or actively replaced.

2. The identity verification circuit of claim 1, wherein the verification key code in the memory is associated with the electronic device such that the processor encodes the biological characteristic code and the verification key code according to the program code to generate the unverified code corresponding to the biological characteristic code and the verification key code.

3. The identity verification circuit of claim 2, wherein the verification key code in the memory is generated by a procedure wherein the memory is provided with the verification key code which is associated with the electronic device, including any one of a media access control address, a subscriber identity module and a password of the electronic device which may be flexibly set by the user.

4. The identity verification circuit of claim 1, wherein the communicator transmits the unverified code via wired or wireless communication.

5. The identity verification circuit of claim 1, wherein the communicator is in compliance with a communication protocol of short-range wireless communication, fixed network communication, mobile communication, or WI-FI.

6. The identity verification circuit of claim 1, wherein the memory is adapted for pre-storing the verification key code associated with the biological characteristic.

7. The identity verification circuit of claim 1, wherein the processor directly stores the biological characteristic code generated by the biological characteristics acquisition device in the memory to form the verification key code.

* * * * *